United States Patent
Hotta et al.

(10) Patent No.: US 7,136,526 B2
(45) Date of Patent: Nov. 14, 2006

(54) CHARACTER STRING RECOGNITION APPARATUS, CHARACTER STRING RECOGNIZING METHOD, AND STORAGE MEDIUM THEREFOR

(75) Inventors: Yoshinobu Hotta, Kawasaki (JP); Katsuhito Fujimoto, Kawasaki (JP); Satoshi Naoi, Kawasaki (JP); Misako Suwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 10/020,249

(22) Filed: Dec. 18, 2001

(65) Prior Publication Data

US 2002/0114515 A1    Aug. 22, 2002

(30) Foreign Application Priority Data

Jan. 24, 2001   (JP) .............................. 2001-015349

(51) Int. Cl.
  *G06K 9/00* (2006.01)
  *G06K 9/18* (2006.01)
(52) U.S. Cl. ...................................... 382/187; 382/186
(58) Field of Classification Search ........ 382/185–187, 382/190, 195, 209, 217, 218, 224, 228, 229–231; 707/5; 714/25
See application file for complete search history.

(56) References Cited

U.S. PATENT DOCUMENTS

| | | | |
|---|---|---|---|
| 6,269,188 B1 * | 7/2001 | Jamali | 382/229 |
| 6,327,386 B1 * | 12/2001 | Mao et al. | 382/186 |
| 6,473,754 B1 * | 10/2002 | Matsubayashi et al. | 707/5 |
| 6,535,619 B1 * | 3/2003 | Suwa et al. | 382/101 |
| 6,539,118 B1 * | 3/2003 | Murray et al. | 382/229 |
| 6,557,115 B1 * | 4/2003 | Gillenwater et al. | 714/25 |
| 6,738,519 B1 * | 5/2004 | Nishiwaki | 382/228 |

FOREIGN PATENT DOCUMENTS

| | | |
|---|---|---|
| JP | A-11-161740 | 6/1999 |
| JP | A-11-328315 | 11/1999 |

* cited by examiner

*Primary Examiner*—Vikkram Bali
(74) *Attorney, Agent, or Firm*—Staas & Halsey LLP

(57) ABSTRACT

A key word is first and automatically extracted from a character string group to be recognized, and entered. Then, a character is recognized by segmenting an individual character from a character string image to be recognized, and a character string corresponding to the extracted/entered key word id extracted. Then, a word area delimited by a key word is extracted from the character string image, and a word is recognized. Furthermore, a word recognition result is verified, and a final character string recognition result is output.

18 Claims, 12 Drawing Sheets

CHARACTER STRING GROUP TO BE RECOGNIZED 20

東京信用組合 千駄木支店 　　　東京都文京区千駄木1-1-1
(Tokyo Credit union Sendagi Branch office)　(1-1-1, Sendagi, Bunkyo-ward, Tokyo-capital)

愛知信用組合 美和支店 　　　愛知県海部郡美和町3-3-3
(Aichi Credit union Miwa Branch office)　(3-3-3, Miwa-town, Kaifu-county, Aichi-prefecture)

長野信用組合 松本支店 　　　長野県松本市石芝2-1-1
(Nagano Credit union Matsumoto Branch office)　(2-1-1, Ishishiba, Matsumoto-city, Nagano-prefecture)

名古屋商工信用組合 熱田支店 　　　愛知県名古屋市熱田区一番3-3-3
(Nagoya Commerce and industry Credit union Atsuta Branch office)　(3-3-3, Ichiban, Atsuta-ward, Nagoya-city, Aichi-prefecture)

長野県農業協同組合 松本支所 　　　長野県松本市石芝1-1-1
(Nagano Agricultural cooperative union Matsumoto Branch)　(1-1-1, Ishishiba, Matsumoto-city, Nagano-prefecture)

茨城農業協同組合 市毛支所 　　　茨城県ひたちなか市市毛2-2-2
(Ibaragi Agricultural cooperative union Ichige Branch)　(2-2-2, Ichige, Hitachinaka-city, Ibaragi-prefecture)

FIG. 4A

CHARACTER, CHARACTER STRING HAVING LARGE NUMBERS OF OCCURRENCES

県、郡、市、区、町、信用組合、県信用組合、
(Prefecture, County, City, Ward, Town, Credit union, Prefectural credit union, 商工信用組合、農業組合、県農業組合、支店、支所 等
Commerce and industrial credit union, Agricultural union, Prefectural agricultural union, Branch office, Branch, etc.)

FIG. 4B

SET OF ASSOCIATED CHARACTERS (STRING)

[信用組合、支店] [農業組合、支所] [県信用組合、支店]
(Credit union, Branch office) (Agricultural cooperative union, Branch) (Prefectural credit union, Branch office)
[県農業組合、支所] [商工信用組合、支店]
(Prefectural agricultural union, Branch) (Commerce and industrial credit union, Branch office)
[都、区] [県、郡、町] 等
(Capital, Ward) (Prefecture, County, Town) etc.

FIG. 4C

CHARACTER STRING RECOGNITION APPARATUS, CHARACTER STRING RECOGNIZING METHOD, AND STORAGE MEDIUM THEREFOR

BACKGROUND OF THE INVENTION

1. Field of the Invention

The present invention relates to a character string recognition apparatus in a character recognition apparatus associated with a character recognition apparatus OCR and software OCR which have recently been more and more demanded as document input appliances.

2. Description of the Related Art

As a method of recognizing a word by dividing a handwritten character string into partial character strings, there has been a suggestion for recognizing a word in an area enclosed by the characters (key characters) detected as delimiters such as 都(capital), 道, 府, and 県(prefecture), 市(city), 区(ward), 郡(county), etc. in a handwritten address (for example, Japanese Patent Publication No. 11-161740, Japanese Patent Publication No. 11-328315).

However, the above mentioned method is used for a handwritten address, and no method has been developed for a common handwritten character string other than an address. In an address, each key character can be a delimiter of character strings, and no plural characters have been used as key characters, that is, a key word.

In the conventional key character extraction system for use in recognizing a handwritten address, a key character is limited to {都 (capital), 道(prefecture), 府(prefecture), 県(prefecture), 市(city), 区(ward), 郡(county), 町(town), 村(village)}. However, when a target character string is not an address, it is necessary to newly set a key character each time a character string recognizing process is performed.

Furthermore, since the number of key characters is one (1) to be extracted from a character string in the conventional method, a key word containing two or more characters cannot be successfully extracted due to, for example, touching characters in the key word, if the conventional method is applied as is.

Additionally since a high precision rejecting process has been not performed in the conventional word recognizing method, a word can be misrecognized as a completely wrong word, thereby discouraging users.

SUMMARY OF THE INVENTION

The present invention has been developed to solve the problem with the above mentioned conventional technology, and aims at providing a character string recognition apparatus capable of automatically extracting a key word from a character string, extracting a key word with high precision although the key word includes a plurality of characters, and preventing a word to be recognized from being misrecognized as quite a different word.

The character string recognition apparatus according to the present invention includes a recognition target character string group storage unit for storing a list of character strings in a category to be recognized; and a key word determination unit for searching the recognition target character string group storage unit for each character to obtain the number of occurrences of each character, defining the character having a large number of occurrences as a key character, and defining the character string having a large number of occurrences as a key word.

Since a key character and a key word can be automatically determined depending on the category to be recognized, an operator, etc. does not have to sequentially set a key character and a key word.

Furthermore, the character string recognition apparatus according to the present invention further includes a key character/word storage unit for storing a determined key character or key word; and a key character/word extraction unit for extracting a character string as a key word if a part of the character string in the key word is extracted when a key character or a key word stored in the key character/word storage unit is extracted from a character string to be recognized.

Thus, a key word can be extracted although no characters in a key word can be recognized, for example, because characters touch each other, etc. when the key word is extracted from a character string to be recognized.

Furthermore, the character string recognition apparatus according to the present invention also includes a word recognition unit for recognizing a word, and a verification unit for checking whether or not a recognition result of the word recognition unit is correct.

For example, the above mentioned verification unit verifies a recognition result based on the line density or the peripheral distribution.

Thus, high precision recognition result can be provided for a user by verifying a word recognition result and rejecting a word recognition result if the word is misrecognized.

BRIEF DESCRIPTION OF THE DRAWINGS

FIGS. 4A, 4B and 4C show examples of a character group to be recognized, and extracted characters and character strings;

DESCRIPTION OF THE PREFERRED EMBODIMENT

A handwritten character string to be processed according to the present invention can be various character strings such as an address, a name, the name of a university, the name of a bank, etc. written on a normal listing. In the present invention, a character is not recognized one by one from the start of a character string, but a character string is divided into a plurality of partial character strings, and words contained in each partial character string are holistically recognized. Thus, characters touching each other and a separated character, which have been the problems with handwritten character strings, can be correctly processed. The character recognition apparatus according to the present invention can be applied not only to the above mentioned handwritten character recognition apparatus, but also to a general character recognition apparatus such as a printed character recognition apparatus, a character recognition apparatus for use in a portable information terminal, etc.

Figure 1:
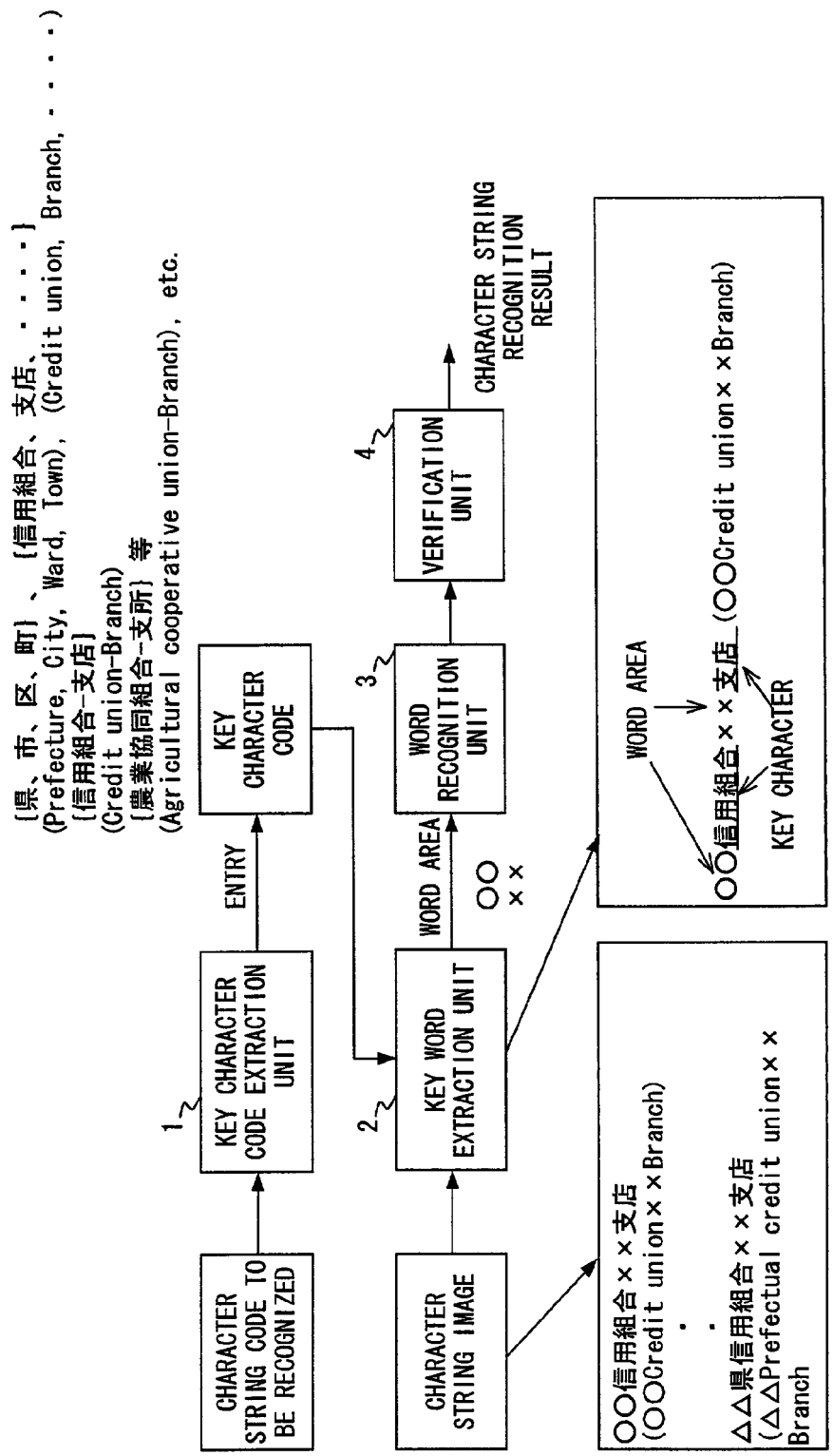
FIG. 1 shows the outline of the present invention.

FIG. 1 shows the outline of the present invention.

To solve the above mentioned problems, as shown in FIG. 1, a key character code extraction unit 1 automatically extracts a key character (key word) from a character string group (code) to be recognized, and enters the key character according to the present invention. Thus, as shown in FIG. 1 (and described later in detail by referring to FIG. 4), in addition to the key characters in address recognition such as 県(prefecture), 市(city), 区(ward), 町(town), etc., a key word, for example, 信用組合(credit union), 支店(branch office), 農業協同組合(agricultural cooperative union), 支所(branch), etc. are entered. In addition, by extracting a set of associated character strings, a set of key words having high probability of appearing together such as 信用組合(credit union) and 支店(branch office), 農業協同組合(agricultural cooperative union) and 支所(branch), etc. are extracted.

Then, a key word extraction unit 2 segments an individual character from a character string image for character recognition, and extracts with high precision the character string corresponding to the key word extracted and entered by the key character code extraction unit 1 in combination with the language process. Then, a word area segmented by a key word is extracted from a character string image, and a word recognition unit 3 recognizes a word. Furthermore, a verification unit 4 verifies a word recognition result, and outputs a final character string recognition result.

Figure 2:
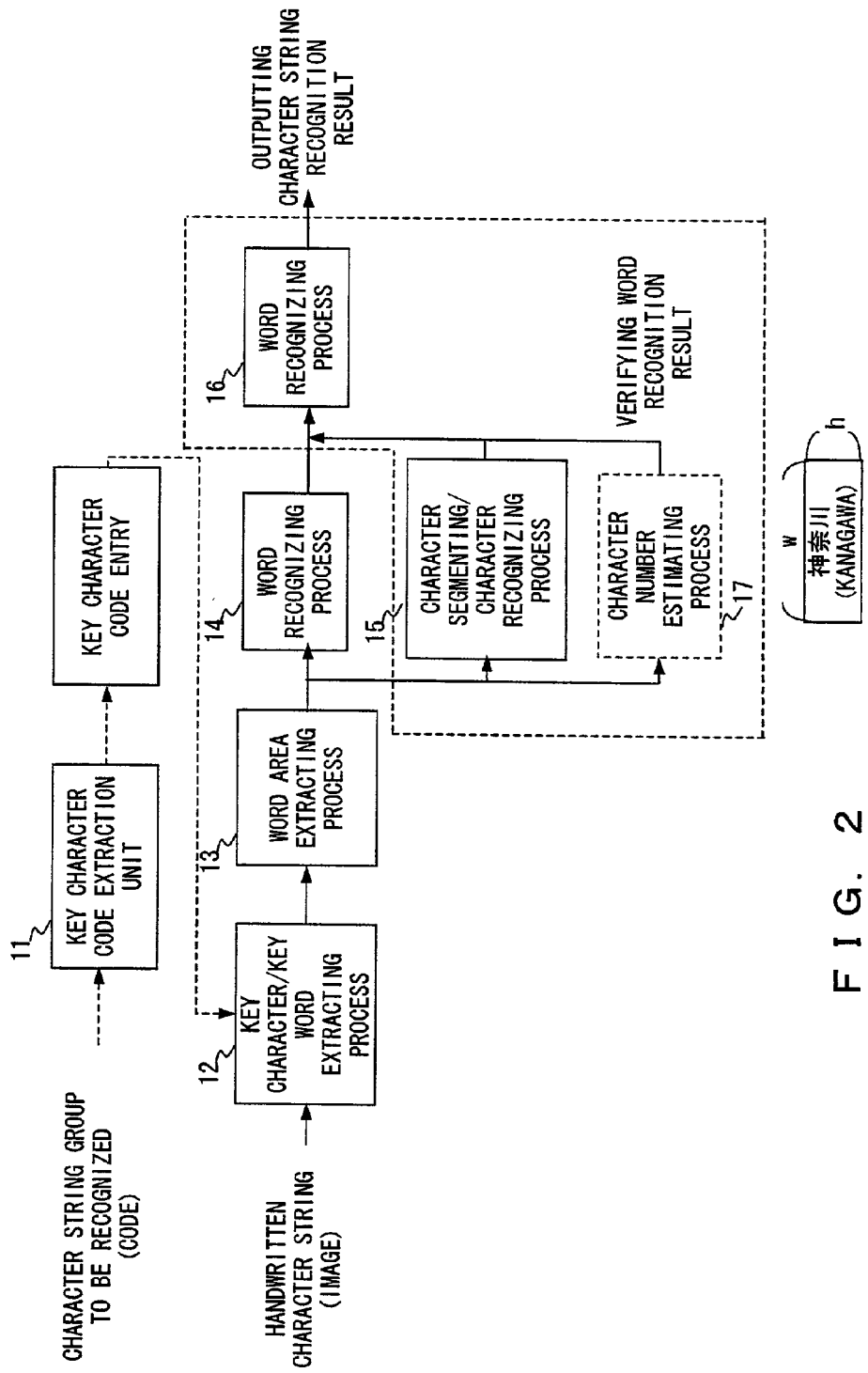
FIG. 2 shows outline of the entire configuration of the character string recognition apparatus according to an embodiment of the present invention.

FIG. 2 shows the outline of the entire configuration of the character string recognition apparatus according to an embodiment of the present invention.

In FIG. 2, in an automatic key character code extracting process 11, a key character code and a key character string (word) code are automatically extracted from a character string group to be recognized (character code group) (both character code and character string code can be hereinafter referred to as a character code). Assume that a character string group to be recognized, for example, an address, a name, the name of a university, the name of financial facilities, etc. is designated (for example, set by a user).

In the automatic key character code extracting process 11, a character code appearing for a target character string group is checked, and a character having a large number of occurrences, and a character and a character string having large numbers of occurrences in a character string unit are entered as key character codes.

Furthermore, the correlation between characters is checked. The correlation refers to, for example, the probability of an occurrence of a character code B when a character code A appears, the probability of a simultaneous occurrence of character codes D and E when a character code C appears, etc. Thus, a set of character codes appearing with correlation is also entered as a key character code.

In the above mentioned process, {県 (prefecture), 市(city), 区(ward), 町(town)} or {県 (prefecture), 郡(county), 町(town)} or {都 (capital), 区(ward), 町(town)} can be automatically extracted as key characters from an address. From the name of financial facilities, {銀行 (bank), 支店(branch office)} {信用組合 (credit union), 営業部(sales department)} {農業協同組合(agricultural cooperative union), 支所(branch)} can be automatically extracted as key characters. For example, in an address, a character which is not a delimiter of an address description can be used as a key character. A character code extracted as described above can be entered as a character code.

In a key character/key word extracting process 12, an individual character is segmented from a handwritten character string (image data) as described above, each of the segmented character is recognized, and a key character and a key word corresponding to the key character code extracted by the automatic key character code extracting process 11 are extracted and entered. Since the number of types of key characters is small, the processing time of key characters is shorter than that of normal characters (for example, about 4,000 types of characters are compared), and key characters indicate higher recognition precision than normal characters.

In a word area extracting process 13, a word area delimited by the key character and key word is extracted from a handwritten character string (image). For example, if a handwritten character string is '東京信用 組合千駄木支店' (Tokyo Credit Union Sendagi Branch office), the areas of '東京' (Tokyo) and '千駄木' (Sendagi) delimited by '信用組合' (Credit Union) and '支店' (Branch office) are extracted as a word area.

In a word recognizing process 14, the character image of the extracted word area is normalized and a characteristic is extracted, and the characteristic is compared with the characteristic data of a word feature dictionary, etc. for word recognition. A word recognizing method can be, for example, methods disclosed by the above mentioned Japanese Patent Publication No.11-161740 and Japanese Patent Publication No. 11-328315, and a method disclosed by Japanese Patent Application 2000-304758 previously suggested by the Applicant of the present invention.

As described above, a word is recognized for a word area enclosed by key words, and a word recognition result is verified as follows.

(i) In a character segmenting/character recognizing process 15, an individual character is segmented, and a word recognizing process is performed. If a rate higher than a threshold is contained in the characters in a recognized word within n highest order of character recognition results, then a word recognition result by a word recognizing unit 14 is output. Otherwise, the result is rejected.

For example, if '神奈川' (Kanagawa) is used as a word example, each of the characters '神', '奈', and '川' is recognized, n higher order probable recognition results are obtained for each character. If each character in a word as a word recognition result is not contained in the probable recognition results at or higher than a predetermined rate (for example, two or more characters in three characters), the result is rejected. Thus, apparent misrecognition can be reduced in the word recognition.

The value of n above can be set by, for example, an operator, etc. in advance.

(ii) Furthermore, as indicated by the dotted lines shown in FIG. 2, a word recognition result can be verified by comparing the numbers of characters in a character number estimating process 17.

That is, when word areas are holistically recognized, the number of characters in a recognized word is compared with the number of characters estimated from a word image. If the difference between the numbers is equal to or larger than a threshold, then a word recognition result is rejected. As a method of estimating the number of characters, for example, a number computed based on the ratio of the height to the width of a bounding rectangular of the word image (the ratio of the height h to the width w in an example shown in FIG. 2=w/h). Otherwise, for example, peripheral distribution (black pixel projection histogram) is obtained for a word image, and a number obtained from the position of a delimiter of the peripheral distribution can be used.

(iii) In a verifying process 16 by line density/peripheral distribution, if a word feature is generated by combining character features, then the combination position of character features reciprocally computed as described later, a word image is divided in each position, and the line density and the peripheral distribution computed for each of the divided areas are computed with the predetermined line density and the peripheral distribution of each character of a recognized word. If they are different, the word recognition result is rejected, thereby verifying the word recognition result. As it is well known, the line density refers to the number of lines measured when a target character is scanned in the vertical or horizontal direction (Y or X direction).

Described below are the automatic key character code extracting (determining) process, the key character/key word extracting process, and the verifying process by line density/peripheral distribution.

Figure 3:
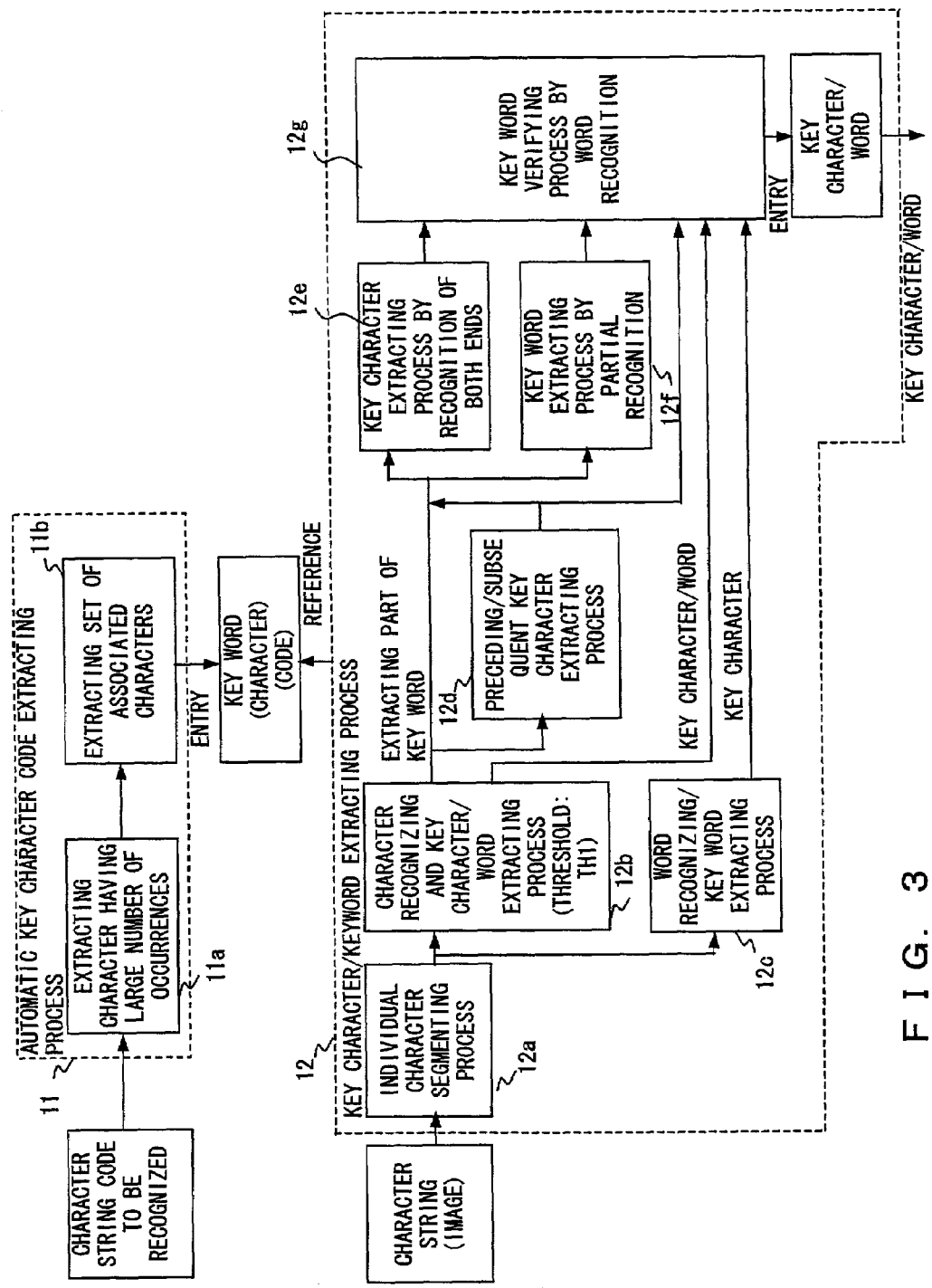
FIG. 3 shows embodiments of the automatic key character code extracting process and the key character/key word extracting process.

(1) Automatic key character code extracting process, and Key character/key word extracting process FIG. 3 shows an embodiment of the automatic key character code extracting process and the key character/key word extracting process.

First, in process 11a in the automatic key character code extracting process 11, a character having a large number of occurrences, a character and a character string having large numbers of occurrences in a character string unit are extracted as a key character code from a code of a character string to be recognized. Furthermore, in process 11b, a set of character codes appearing with correlation is extracted, and a set of characters is entered as a key character code.

The above mentioned 'character having a large number of occurrences in a character string unit' can be, for example, as shown in FIG. 4A, '県 (prefecture)' because it appears in a number of character strings in '愛知県海 部郡美和町3- 3- 3' (3-3-3, Miwa-town, Kaifu-county, Aichi-prefecture) '長野県信用組合松本支店' (Nagano Credit union Matsumoto Branch office), etc. The 県 (prefecture) frequently appears in the entire character string group 20 to be recognized. Thus, there can be a character frequently appearing in both groups.

FIGS. 4A through 4C show examples of a character string group to be recognized, and key character codes extracted therefrom.

FIG. 4A shows an example of a list 20 of a character string group to be recognized. FIG. 4A shows a character string, but a code of each character in the character string group is actually used.

The list of the character string group 20 to be recognized contains character strings as recognition results in the category to be recognized (for example, an address, a name, the name of a university, the name of financial facilities, etc. as described above).

In the example shown in FIG. 4A, for example, a client/banker, etc. writes the name of financial facilities (name of a bank and the name of its branch office) and its address in an actual use on a predetermined form, and a character recognition apparatus reads/recognizes them. In this use, the names of actual financial facilities to be recognized (name of a bank and the name of its branch office) are listed. That is, the client, etc. enters on a form one of the lists shown in FIG. 4A, for example, '東京信用組合千駄木支店東京都文京区千駄木1-1-1' (Tokyo Credit union Sendagi Branch office 1-1-1, Sendagi, Bunkyo-ward, Tokyo-Capital), etc. Therefore, these lists can be generated in advance, based on which the present embodiment performs the following process.

First, using the above mentioned list of the character string group to be recognized, the number of occurrences of each character (character code) is checked in the list. Then, a character code having a large number of occurrences (for example, up to m highest order codes; the value of m is determined set in advance by an operator, etc.) is extracted as a key character code. However, a key character is extracted not only as one character, but also as two characters (hereinafter possibly referred to as a key character string). When characters having large numbers of occurrences continuously appear, they are extracted as a key character string. For example, in a list shown in FIG. 4A, characters having large numbers of occurrences such as '県', '市', '支', '店', '所', etc. are extracted, '県' and '市' have no other characters having large numbers of occurrences and continuously appearing before or after them. Therefore, each of them is individually extracted as a key character. On the other hand, since '支', '店', and '所' continuously appear as '支店', '支所', etc., it is extracted as a key character string. Similarly, for example, '信用組合', '農業組合', etc. are extract as key character strings.

For example, assuming that a character code having a large number of occurrences is extracted from a character string group to be recognized shown in FIG. 4A, for example, as shown in FIG. 4B, key character codes such as the names of financial facilities, agricultural cooperative union, etc. such as '信用組合', '商工信用組合', etc. are extracted in addition to the characters in recognizing an address expressed by 県, 都, etc. Furthermore, if the number of occurrences of a character string indicated with a character such as 県, etc. such as '. . . 県信用組合', '. . . 県農業協同組合', etc., is large, then it is also extracted as a key character code. When the correlation of appearances of characters is checked, a set of character codes indicating high correlation is extracted as shown in FIG. 4C.

The method of checking correlation (practical processing method) can be, for example, counting for each character code in a character string to be recognized, which contains the character, other character codes, accumulating the values, and extracting a character having the largest accumulation value or having a value larger than a predetermined threshold (set by an operator, etc. in advance). For example, when a key character '都' is used as an example, the first '都' appears in the character string to be recognized '東京都文京区千駄木1-1-1' in the list shown in FIG. 4A. Therefore, other character codes '東', '京', '区', '千', '駄', and '木' are counted in association with '都' (numbers/symbols such as 1-1-1, etc. are not counted). If this process is performed on all character strings to be recognized shown in FIG. 4A, the count value (accumulation value) of '区' is the largest for '都'. Therefore, '都'-'区' is extracted as a set of character codes having high correlation. When this process is performed not only on each character code, but also on each character string, for example, '信用組合'-'支店', '農業組合'-'支所', etc. are extracted as a set of character strings having high correlation.

The above mentioned process can be performed on all characters and character strings, but it is more effective to perform the process on the already extracted key character or key character string.

When a character which is rarely misrecognized in character recognition is entered in advance and the key character code is extracted, a key word can be more correctly extracted in the process of extracting a key word from a character image.

In an individual character segmenting process 12a in the key character/key word extracting process 12, a character is individually segmented from a handwritten character string (image data), and each character is recognized as described above, and a key character and a key word corresponding to a key character code extracted by the automatic key character code extracting process 11 are extracted.

Described below is the process of extracting a plurality of key characters, that is, a key word. For example, using the name of financial facilities, '信用組合' and '農業協同組合' are extracted as key words from '○○信用組合ΔΔ支店', '○○農業協同', etc. A key character such as 県, 市, 区, 町, etc. can be extracted in the key character/key word extracting process described below as a key word is extracted.

The process of extracting a common key word is described below. In a character recognizing and key character/word extracting process 12b, a segmented individual character is recognized, and the distance values of n probable higher order recognition results are checked for each character. If a character in a key word entered in advance belongs to probable recognition results whose distance values are equal to or smaller than a threshold TH1, then it is a probable key character of a target character.

When there are a plurality of relevant characters in a key word, a plurality of probable key characters are presented. The process is performed on all characters. When the same character string as the key word is contained in a sequence of probable key characters, the character string is extracted as a key word.

Figure 5:
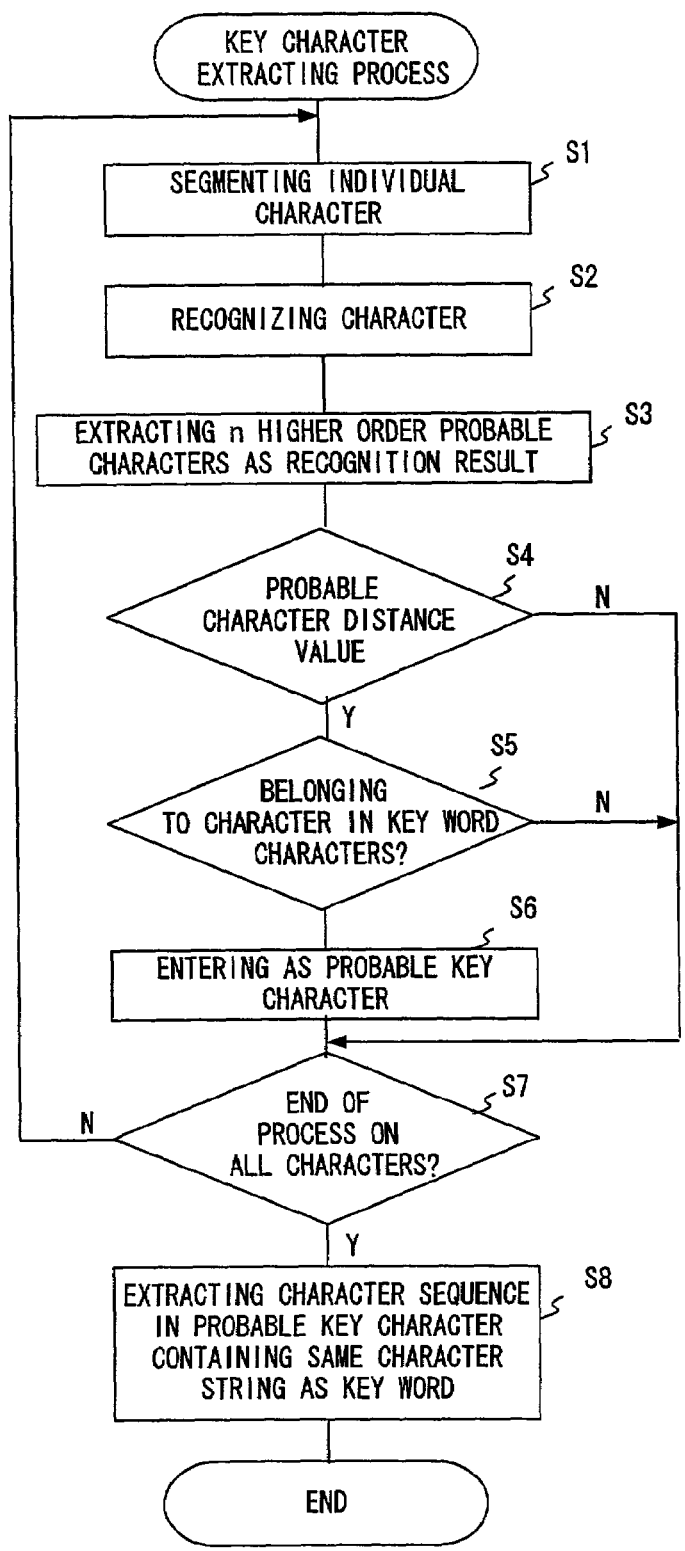
FIG. 5 is a flowchart of an individual character segmenting process and a character recognition and key word extracting process.

FIG. 5 is a flowchart of the above mentioned individual character segmenting and key character/key word extracting process.

In step S1, an individual character is segmented, and the segmented character is recognized in step S2. The character is recognized by extracting a characteristic of a segmented character, extracting a probable character by comparing the characteristic data with a stored dictionary, and obtaining a value of the distance between the segmented character and the probable character.

In step S3, the n probable higher order characters of the character recognition results obtained as described above are extracted. In step S4, it is checked whether or not the distance value of a probable character is smaller than the threshold TH1. If the distance value of the probable character is smaller than the threshold TH1, then it is checked in step S5 whether or not the probable character is contained in the key word entered in the automatic key character code extracting process 11. If yes, the character is entered as a probable key character in step S6.

The above mentioned process is repeated until the process is performed on all characters. When the process is performed on all characters, control is passed from step S7 to step S8, and a sequence of probable key characters (a combination of characters) containing the same character string as the key word entered in the automatic key character code extracting process 11 is extracted as a key word.

For example, assume that a character string '○Δ' (unknown characters) is contained in a character string image to be recognized, '銀' and '銭' are entered as probable key characters for the character '○', and '行' and '桁' are entered as probable key characters for the character 'Δ' in the process in steps S4 through S6. Assuming that only '銀行' (bank) is entered as a key word in the automatic key character code extracting process 11 in the combinations of the probable key characters ('銭桁', '銀桁', '銭行', and '銀行') ('銭' and '桁' are considered to be used in completely different key words entered), the character string '○Δ' is recognized as the key word '銀行'.

On the other hand, when the above mentioned character recognition is performed, a word recognizing process is performed on a character segmented as an individual character in a word recognizing/key word extracting process 12c.

Figure 6:
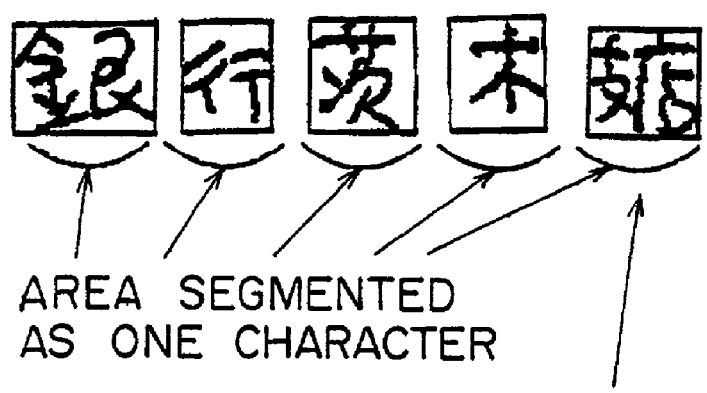
FIG. 6 shows the case in which a character segmented as an individual character is recognized as a word.

For example, when small written characters touch each other as the '支店' (branch office) as shown in FIG. 6, the touching characters can be misrecognized as one character when characters are segmented.

In this case, in the word recognizing/key word extracting process 12c, a comparing process is performed on an area segmented as a character in word feature as well as character feature. When a distance condition is satisfied in the comparison in word feature, the word is extracted as a key word.

When a part of characters in a key character entered in advance are extracted in the above mentioned key character/key word extracting process, the following process is performed.

(i) 2-Step Extraction Using Multiple Stage Threshold

When only a part of a key word is extracted from a character string, a distance value condition of the key word extraction is mitigated on the preceding/subsequent character recognition results in a preceding/subsequent key character extracting process 12d, and the extracting process is performed again.

That is, although a probable key character is extracted when a key character is contained in probable recognition results having distance values equal to or larger than TH1 after obtaining character recognition results from a character, a key character is extracted from probable recognition results having distance values equal to or larger than TH2 (TH2>TH1) for the preceding/subsequent characters of an extracted key character. Thus, even if a part of characters of a key word indicate considerable deformation, the characters can be extracted as a part of the key word.

Values that an operator, etc. considers appropriate are set as the values of TH1 and TH2 based on, for example, the past experiment results, etc.

(ii) Key Character Extracting Process by Recognition of Both Ends

In a character string containing a number of touching characters, it is often difficult to segment and recognize all individual characters belonging to key words For example, in a key word image '農業協同組合', the characters '業協' complicatedly touch each other, and cannot be successfully segmented in the character segmenting process. Then, a key character extracting process 12e by recognition of both ends is performed.

In the key character extracting process 12e, the leading and trailing characters of a character string are extracted for a key word containing N or more characters, and when P% or more characters of the entire characters are extracted, it is assumed that a key word has been extracted. The above mentioned N and P are the values obtained in the experiment. For example, P=60.

In '農業協同組合', for example, when the probable key characters '農業○○組合' and '農○○同組合' are extracted, the character string is defined as '農業協同組合'. (In this example, it is assumed that no other similar words ('農林協同組合', etc.) exist.)

(iii) Key Word Extracting Process by Partial Recognition

When the leading character of a key word touches the preceding character, the key word cannot be correctly extracted, and the above mentioned both end recognition system cannot be successfully applied. Therefore, a key word extracting process 12f by partial recognition is performed.

In the key word extracting process 12f by partial recognition, when a part of characters of the first and second half of a character string are recognized for key words each containing M or more characters, the key character extracting process 12e by recognition of both ends ((ii) above) is performed on both ends of partial character string, and the partial character string is extracted as a partial key word when the condition is satisfied (when P% or more characters are extracted).

In '農業協同組合', for example, when '○○○業△△組合' is recognized, the key word contained in the character string is estimated to be '農業協同組合'. However, since the position of the '農' is uncertain, (that is, in this case, since there is the possibility that the '農' touches any preceding character, it cannot be clearly recognized which part of the touching characters belongs to '農'), the portion subsequent to the '業' is determined as '業協同組合'.

As described above, if a key word is extracted as described above, the extracted key word is verified in a key word verifying process 12g by word recognition.

In the key word verifying process 12g by word recognition, a word feature of a key word is generated when the key word is extracted. Then, a word recognizing process is performed on a key word area extracted in the key word extracting process, and only the areas satisfying the distance condition are extracted as key words.

Furthermore, some word images can be easily misrecognized in comparing word features in combinations of characters other than key words.

Then, these easily misrecognized word images are added to a word feature dictionary as similar word features for use in identifying from correct word features, thereby improving the extraction precision of the key word.

(2) Verifying process by line density/peripheral distribution

As described above by referring to FIG. 2, a word area delimited by a key word is extracted, a word is recognized in the word area delimited by the key word, character segmentation and verification by character recognition are performed, a word recognition result is verified by assuming the number of characters, and the verifying process by line density/peripheral distribution is performed on a word recognition result.

Figure 7:
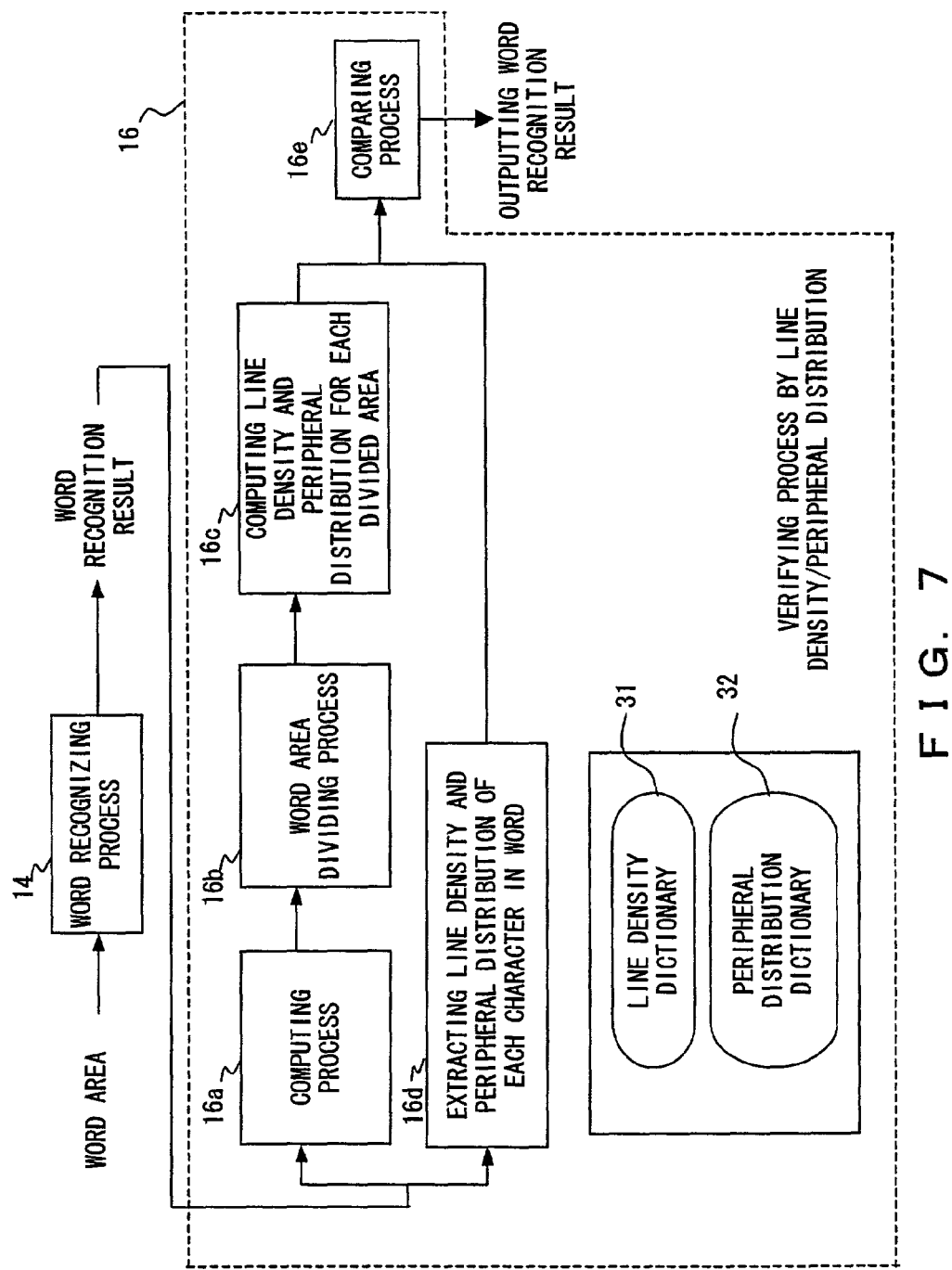
FIG. 7 shows a verifying process by line density/peripheral distribution.

The verifying process by line density/peripheral distribution is described below by referring to FIGS. 7 and 8. In this example, in the word recognizing process in the word recognizing process 14, a word is recognized by generating a word feature by a combination of character features, and comparing the word feature with the characteristic of the word image in the extracted word area.

Since the 'line density' and the 'peripheral distribution' are well known, the detailed explanation is omitted here.

When a word recognition result is obtained by the word recognizing process 14, the combination position of character features is reciprocally computed in a character feature combination position computing process 16a. That is, the combination position of character features is reciprocally computed from a word template used when a word is compared in the system of recognizing a word by generating word features.

Figure 8:
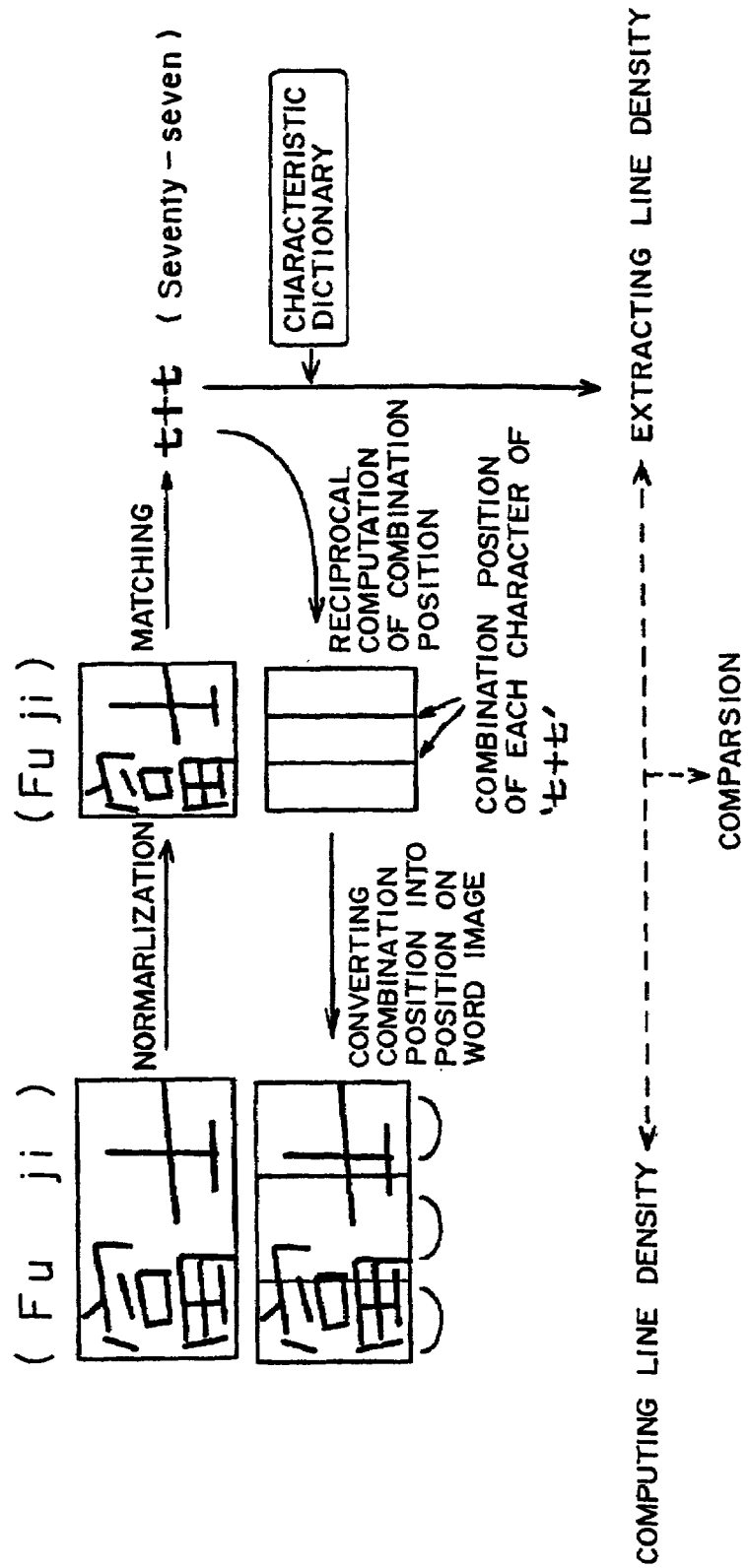
FIG. 8 is an explanatory view for a verifying process by line density/peripheral distribution.

For example, as shown in FIG. 8, when '七十七' (seventy-seven) is obtained as a comparison result of a word image '富士' (Fuji), the combination position is reciprocally computed from the word template, and the combination position of each character of '七十七' is obtained.

Since the combination position is the position in the word normalized image, the position is converted into the position in a word image, and a word area is divided in the word image in each of the converted positions in a word area dividing process 16b. For example, as shown in FIG. 8, the combination position of each character of '七十七' is converted into the position on the word image, and the word image '富士' is divided.

In a line density and peripheral distribution computing process 16c, the line density or the peripheral distribution is computed for each of the divided areas. For example, in the example shown in FIG. 8, the line density of each of the divided areas of the word image '富士' is computed.

On the other hand, in a line density and peripheral distribution computing process 16d, the line density or the peripheral distribution of each character is computed for each character of a word recognition result by referring to the line density dictionary 31, the peripheral distribution dictionary 32, etc. For example, in the example shown in FIG. 8, the line density of each character of the word '七十七' is extracted.

Then, in a comparing process 16e, the line density or the peripheral distribution computed for each of the divided areas is compared with the line density or the peripheral distribution of each character of the recognized word. If they do not match, the word recognition result is rejected.

The difference level for rejection (threshold) is set by an operator, etc. in advance based on an experiment result, etc.

In the example shown in FIG. 8, since the line density in each area obtained by dividing a word image '富士' is apparently different from the line density of each character of the word '七十七', the word recognition result '七十七' is rejected.

Figure 9:
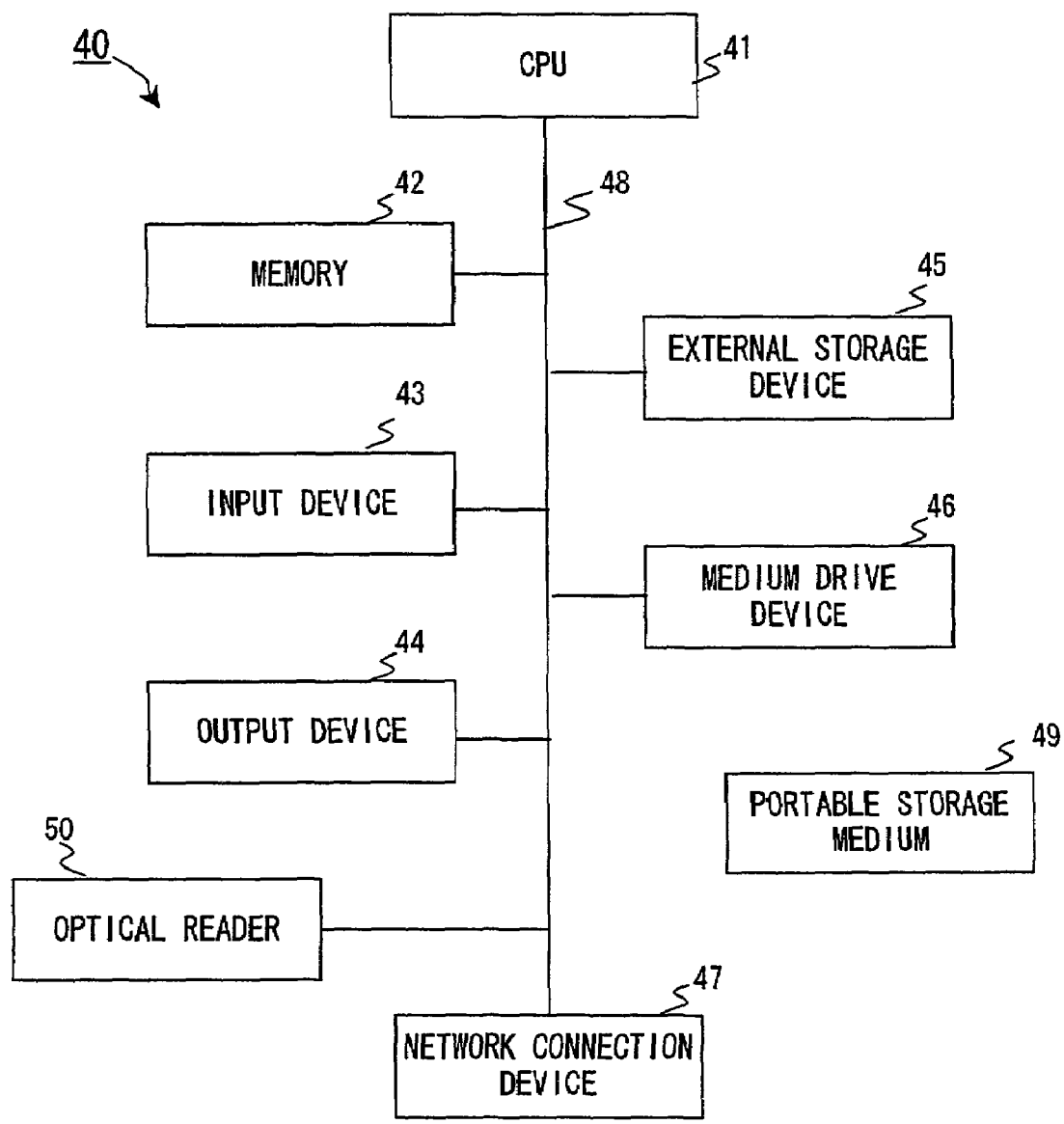
FIG. 9 shows a configuration of the hardware of an information processing device.

FIG. 9 shows an example of a hardware configuration of the information processing device realizing the character string recognition apparatus according to an embodiment of the present invention.

The character string recognition apparatus according to an embodiment of the present invention can be realized by a normal computer system as described above. (The apparatus is not limited to this system. That is, it can be realized by a portable information processing device, etc. such as a PDA/ hand-held PC, etc.)

An information processing device 40 shown in FIG. 9 comprises a CPU 41, memory 42, an input device 43, an output device 44, an external storage device 45, a medium drive device 46, a network connection device 47, etc. interconnected through a bus 48. Furthermore, an optical reader 50, etc. is connected to the bus 48. The configuration shown in FIG. 9 is an example, and the device is not limited to this configuration.

The optical reader 50 is, for example, a scanner, a digital camera, etc., and transfers digital image data obtained by optically reading a character, etc. on paper to the information processing device 40. (This refers to the above mentioned 'character string image' and 'handwritten character string (image)'.)

The CPU 41 is a central processing unit for controlling the entire information processing device 40.

The memory 42 can be RAM, etc. for temporarily storing a program or data stored in the external storage device 45 (or a portable storage medium 49) when a program is executed, data is updated, etc. The CPU 41 executes various processes as described above using a program/data read to the memory 42.

The input device 43 is, for example, a keyboard, a mouse, etc., and is used when an operator, etc. sets the above mentioned various set values (m higher order values, n higher order values, etc.).

The output device 44 can be a display, etc., and displays a setting screen for use by an operator setting the above mentioned set values, a character string recognition result, etc.

The external storage device 45 can be, for example, a magnetic disk device, an optical disk device, a magneto-optical disk device, etc., and stores a program/data, etc. for realization of various functions of the above mentioned character recognition apparatus.

The medium drive device 46 reads the program/data, etc. stored in the portable storage medium 49. The portable storage medium 49 can be, for example, a FD (floppy disk), CD-ROM, a DVD, magneto-optical disk, etc.

The network connection device 47 is connected to a network, and transmits and receives a program/data to and from an external information processing device.

Figure 10:
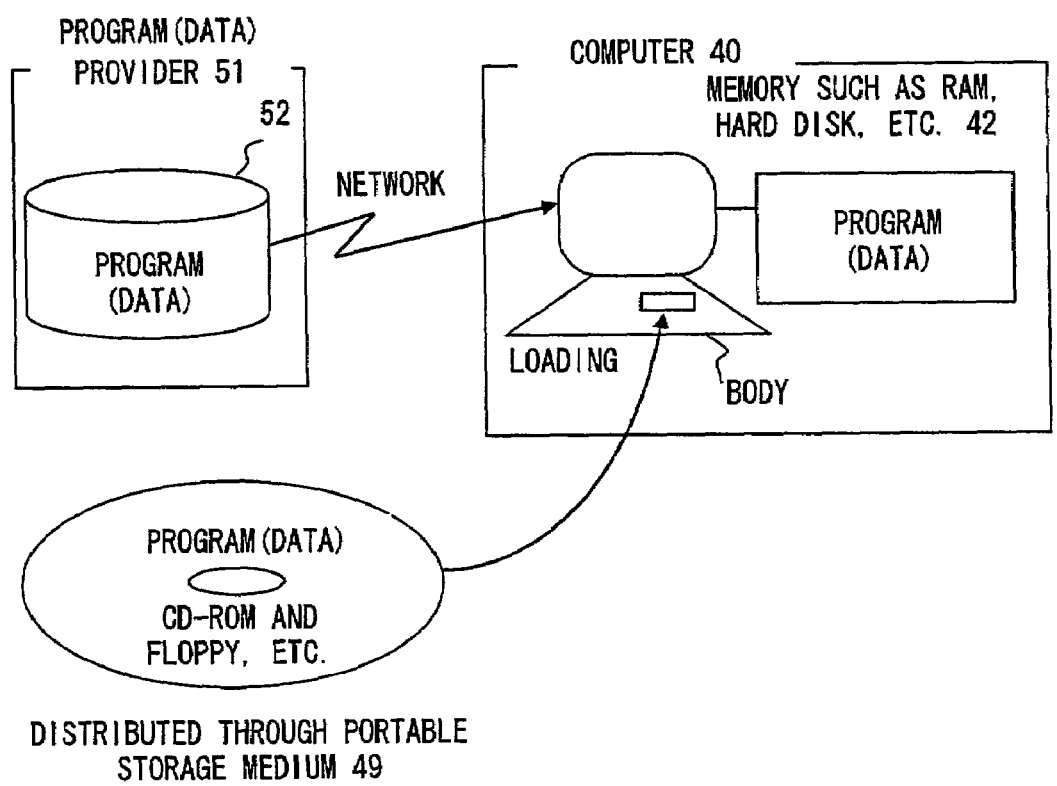
FIG. 10 shows an example of a storage medium.

FIG. 10 shows an example of a storage medium.

As shown in FIG. 10, the program/data can be stored in the portable storage medium 49, loaded into the information processing device, stored in the memory 42, and is then executed. The program/data can be downloaded from a storage device 52 of an external information provider device 51 through a network (Internet, etc.) connected through the network connection device 47.

The present invention can be configured as a storage medium (the portable storage medium 49, etc.) storing the program/data, as a program, as a network (transmission medium) for transmitting the program/data, and as a transmission signal transmitted through the transmission medium when the program/data is downloaded.

In the above mentioned present invention, the following effects can be obtained.

(1) A code string of a key word which is a node of a character string is automatically extracted from a character string category to be recognized and expressed as a character code. A key word extracted by a key character code extraction unit or a part of it is extracted from a character string image. The character strings in partial areas determined by the extracted key words are holistically recognized. The results of the holistic recognition are verified. Thus, a key word can be automatically extracted from character strings, and the key word can be extracted with high precision although the it is formed by a plurality of characters. Furthermore, since a verifying process is performed on word recognition results, misrecognizing a word as a completely different word can be reduced.

(2) When only a part of a character forming a key word is extracted, the extraction condition as a key character for the preceding and subsequent characters is mitigated, and a character is re-extracted, thereby extracting a key word with high precision although a part of the characters in the key word is considerable deformed.

(3) When the leading and trailing characters in the characters of a key word, and more than a predetermined ratio of the characters forming the key word are extracted, the partial character string is regarded as a key word, thereby extracting a key word with high precision although characters of the key word touch each other.

(4) When two or more separate characters are extracted in the characters forming a key word, and when more than a predetermined ratio of the characters in an area enclosed by the extracted characters, the partial character string is extracted as a partial character string of the key word, thereby extracting a key word with high precision although the end character touches one of the surrounding characters.

(5) A holistic recognition is performed on an extracted key word or a partial key word, and the probability as a word is verified, thereby extracting a key word with high precision although the character recognition although the character recognition precision is low.

(6) An area segmented as one character is compared in character feature and word feature, and a character string forming part of a key word or the key word is extracted, thereby extracting a key word with high precision although characters in the key word containing only a small number of characters touch each other.

(7) The recognition precision in word recognition is enhanced by referring to the dictionary in which a word easily misrecognized as a key word is entered as a similar word, thereby extracting a key word with high precision.

(8) When a code string of a key word is extracted, a character having a large number of occurrences in the entire character strings to be recognized, a character having a large number of occurrences in a character string unit, and/or a set of closely associated characters are extracted as key words, thereby automatically extracting a key word from a character string (code) to be recognized.

(9) A character which is not easily misrecognized is entered in advance, and is extracted as a key character when a code string of a key word as a node of a character string is extracted from a character string category, thereby more correctly extracting a key word.

(10) When a word area delimited by a key character/key word is holistically recognized, a word recognizing process is performed, a character is segmented for the area, and the character is recognized so that a word recognition result can be determined when a character contained in the word recognition result is contained as n higher order and has a number of occurrences equal to or larger than a threshold in the character recognition result, thereby reducing apparent misrecognition.

(11) When a word area is holistically recognized based on a word feature generated by combining character features, the division position of each character in a word image is computed from the matching template, the line density or the peripheral distribution of a word image obtained at each division position is compared with the line density or the peripheral distribution held by each character of a recognized word, and a word recognition result is rejected when a sum of the line density, peripheral distribution, or the difference in the collation ratio is larger than a threshold, thereby reducing the misrecognition of word recognition.

(12) When a word area is holistically recognized based on a word feature generated by combining character features, the number of characters in a recognized word is compared with the number of characters estimated from a word image, and a word recognition result is rejected when the difference in the number of characters is larger than a threshold, thereby reducing the misrecognition of word recognition.

What is claimed is:

1. A character string recognition apparatus, comprising:
   a key character code extraction unit automatically extracting a code string of a key word which is a node of a character string from a character string category to be recognized and expressed as at least one character code, by extracting at least one of a first character having a first predetermined number of occurrences among a first set of character strings to be recognized, a second character having a second predetermined number of occurrences in a character string unit, and a second set of closely associated characters as the key word;
   a key word extraction unit separating an image of the character string into images of individual characters, recognizing the individual character images and extracting as key word characters, a string of characters corresponding to the code string of the key word;
   a partial area extraction unit extracting a partial area falling between extracted key words from the image of the character string; and
   a recognition unit holistically recognizing a character string in the partial area extracted by said partial area extraction unit.

2. The apparatus according to claim 1, further comprising a verification unit verifying a recognition result of the holistic recognition by said recognition unit.

3. The apparatus according to claim 2, wherein:
   said recognition unit holistically recognizes a word area based on a word feature generated by combining character features;
   said verification unit computes a division position of each character in a word image from a matching template, compares line density of a word image obtained at each division position with line density held by each character of a recognized word, and rejects a word recognition result when a sum of the line density, or a difference in a collation ratio is larger than a threshold.

4. The apparatus according to claim 2, wherein:
   said recognition unit holistically recognizes a word area based on a word feature generated by combining character features;
   said verification unit computes a division position of each character in a word image from a matching template, compares peripheral distribution of a word image obtained at each division position with peripheral distribution held by each character of a recognized word, and rejects a word recognition result when a sum of the peripheral distribution, or a difference in a collation ratio is larger than a threshold.

5. The apparatus according to claim 2, wherein:
   said recognition unit holistically recognizes a word area based on a word feature generated by combining character features;
   said verification unit compares a number of characters in a recognized word is compared with a number of characters estimated from a word image, and rejects a word recognition result when a difference in the number of characters is larger than a threshold.

6. The apparatus according to claim 1, wherein when the key word is extracted from the image of the character string, but only part of a key character forming the key word is extracted, an extraction condition of the key character for preceding and subsequent characters is mitigated, and the key character is re-extracted.

7. The apparatus according to claim 1, wherein during extraction of the key word from the image of the character string, when a partial character string, including leading and trailing characters of the key word and more than a predetermined percentage of the characters forming the key word, is extracted, said key word extraction unit regards the partial character string as the key word.

8. The apparatus according to claim 1, wherein during extraction of the key word from the image of the character string, when a partial character string includes at least two separate characters in the key characters and more than a predetermined percentage of the characters in the key word are in an area enclosed by the separate characters, said key word extraction unit extracts the partial character string as a portion of the key word.

9. The apparatus according to claim 1, wherein when a key word is extracted from the image of the character string, said key word extraction unit performs a holistic recognizing process on an extracted key word or a partial key word, and verifies probability as a word.

10. The apparatus according to claim 1, wherein when a key word is extracted from the image of the character string, said key word extraction unit compares an area segmented as one character in character feature and word feature, and extracts the string of characters forming at least part of the key word.

11. The apparatus according to claim 1, wherein when a word is extracted using word feature of the key word from the image of the character string, said key word extraction unit enhances recognition precision in word recognition by referring to a dictionary in which a word easily misrecognized as the key word is entered as a similar word.

12. The apparatus according to claim 1, wherein an identifiable character which is not easily misrecognized is entered in advance, and said key character code extraction unit extracts the identifiable character as a key character when the code string of the key word is the node of the character string from a character string category.

13. The apparatus according to claim 1, wherein when a word area is holistically recognized, said recognition unit performs a word recognizing process, segments a character for the area, and recognizes the character so that a word recognition result can be determined when a character contained in the word recognition result is contained as n higher order and has a number of occurrences equal to or larger than a threshold in the character recognition result.

14. A character string recognition apparatus, comprising:
   key character code extraction means for automatically extracting a code string of a key word, which is a node of a character string from a character string category to be recognized and expressed as a character code, by extracting at least one of a first character having a first predetermined number of occurrences among a first set of character strings to be recognized, a second character having a second predetermined number of occurrences in a character string unit, and a second set of closely associated characters as the key word;

key word extraction means for separating an image of the character string into images of individual characters, recognizing the individual character images and extracting as key word characters, a string of characters corresponding to the code string of the key word;

a partial area extraction means extracting a partial area falling between extracted key words from the image of the character string; and recognition means for holistically recognizing a character string in the partial area extracted by said partial area extraction unit.

15. A character string recognition apparatus, comprising:

a recognition target character string group storage unit storing a list of character strings in a category to be recognized;

a key word determination unit searching said recognition target character string group storage unit for each character to obtain a number of occurrences of each character, defining a character having a large number of occurrences as a key character, and defining a character string having a large number of occurrences as a key word; and a key word extraction unit separating an image of a character string into images of individual characters, recognizing the individual character images in the character string and extracting as key word characters, a string of characters corresponding to the code string of the key word, by extracting at least one of a first character having a first predetermined number of occurrences among a first set of character strings to be recognized, a second character having a second predetermined number of occurrences in a character string unit, and a second set of closely associated characters as the key word.

16. A character string recognition apparatus, comprising:

a key character/word storage unit storing a determined key character or key word; and a key character/word extraction unit separating an image of the character string into images of individual characters, recognizing the individual character images and extracting a character string as a key word if a part of the character string in the key word is extracted when a key character or a key word stored in said key character/word storage unit is extracted from the image of the character string to be recognized by extracting at least one of a first character having a first predetermined number of occurrences among a first set of character strings to be recognized, a second character having a second predetermined number of occurrences in a character string unit, and a second set of closely associated characters as the key word.

17. A character string recognizing method, comprising:

obtaining a number of occurrences of each character in a list stored in advance based on the list of character strings in a category to be recognized, defining a character having a large number of occurrences as a key character, and defining a character string having a large number of occurrences as a key word;

extracting the key character or the key word from a character string image to be recognized by extracting at least one of a first character having a first predetermined number of occurrences among a first set of character strings to be recognized, a second character having a second predetermined number of occurrences in a character string unit, and a second set of closely associated characters as the key word; and recognizing individual character images in an image of a character string to identify a word for each area delimited by each key character or key word in the character string image to be recognized.

18. A computer readable medium encoded with a computer program recognizing a character string image, said computer program controlling a processor to perform a method comprising:

automatically extracting a code string of a key word which is a node of a character string from a character string category to be recognized and expressed as a character code, by extracting at least one of a first character having a first predetermined number of occurrences among a first set of character strings to be recognized, a second character having a second predetermined number of occurrences in a character string unit and a second set of closely associated characters as the key word;

separating an image of the character string into images of individual characters; recognizing the individual character images;

extracting the extracted key word or a part of the key word from a character string image;

holistically recognizing character strings in partial areas determined by the extracted key and words.

* * * * *